United States Patent
Tanner et al.

(10) Patent No.: US 9,787,476 B2
(45) Date of Patent: *Oct. 10, 2017

(54) IMAGE VERIFICATION BY AN ELECTRONIC DEVICE

(71) Applicant: MASTERCARD INTERNATIONAL INCORPORATED, Purchase, NY (US)

(72) Inventors: Colin Tanner, Ickenham (GB); David Sylvester, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,169

(22) Filed: Nov. 15, 2016

(65) Prior Publication Data

US 2017/0063555 A1  Mar. 2, 2017

Related U.S. Application Data

(63) Continuation of application No. 14/478,267, filed on Sep. 5, 2014, now Pat. No. 9,531,549.

(30) Foreign Application Priority Data

Sep. 6, 2013 (GB) .................................. 1315882.9

(51) Int. Cl.
    *H04L 9/32* (2006.01)
    *H04L 9/14* (2006.01)
    (Continued)

(52) U.S. Cl.
    CPC ........ *H04L 9/3263* (2013.01); *G06F 21/6254* (2013.01); *G06Q 20/3674* (2013.01);
    (Continued)

(58) Field of Classification Search
    CPC . H04L 9/14; H04L 9/30; H04L 9/3263; H04L 9/3268; H04L 2209/56;
    (Continued)

(56) References Cited

U.S. PATENT DOCUMENTS 7,542,992 B1   6/2009 Pandurangan et al.
2003/0066893 A1   4/2003 Yap et al.
(Continued)

FOREIGN PATENT DOCUMENTS

WO   2008/008306   1/2008

*Primary Examiner* — Kambiz Zand
*Assistant Examiner* — Benjamin Kaplan
(74) *Attorney, Agent, or Firm* — Harness, Dickey & Pierce, P.L.C.

(57) ABSTRACT

A method for verifying an image by a first electronic device, the method comprising the first electronic device: sending a request for an image to a second electronic device, wherein the second electronic device is remote from the first electronic device and, optionally, a server; receiving an image and a certificate from the second electronic device, wherein the certificate comprises a protected checksum of at least the image; generating a checksum in dependence on at least the received image; performing a comparison in dependence on said generated checksum and the protected checksum received in the certificate; and verifying the received image in dependence upon the comparison. Advantageously, the first electronic device is able to verify each received image and to prevent the display of any received images that are not authenticated. Applications include the display of card images.

20 Claims, 4 Drawing Sheets

(51) Int. Cl.
  *H04L 9/30*   (2006.01)
  *G09C 5/00*   (2006.01)
  *G06F 21/62*  (2013.01)
  *G06Q 20/36*  (2012.01)
  *G06Q 20/38*  (2012.01)

(52) U.S. Cl.
  CPC ........... *G06Q 20/3829* (2013.01); *G09C 5/00* (2013.01); *H04L 9/14* (2013.01); *H04L 9/30* (2013.01); *H04L 9/3268* (2013.01); *H04L 2209/56* (2013.01)

(58) Field of Classification Search
  CPC ............ G06F 21/6254; G06Q 20/3674; G06Q 20/3829; G09C 5/00
  USPC .......................................... 713/156, 168, 176
  See application file for complete search history.

(56) References Cited

U.S. PATENT DOCUMENTS

| | | |
|---|---|---|
| 2003/0140007 A1 | 7/2003 | Kramer et al. |
| 2008/0147564 A1* | 6/2008 | Singhal .................. G06Q 20/04 705/67 |
| 2010/0199089 A1* | 8/2010 | Vysogorets ............. G06F 21/34 713/168 |
| 2011/0214041 A1 | 9/2011 | Nolte |
| 2012/0031969 A1* | 2/2012 | Hammad ................ G06F 21/34 235/380 |
| 2012/0221473 A1 | 8/2012 | Redman et al. |
| 2013/0047144 A1 | 2/2013 | Chalmers et al. |
| 2013/0332179 A1 | 12/2013 | Girard |

\* cited by examiner

IMAGE VERIFICATION BY AN ELECTRONIC DEVICE

CROSS-REFERENCE TO RELATED APPLICATIONS

This application is a continuation of U.S. patent application Ser. No. 14/478,267 filed Sep. 5, 2014, which claims the benefit of and priority to Great Britain Application No. 1315882.9 filed Sep. 6, 2013. The entire disclosures of the above applications are incorporated herein by reference.

FIELD

The present disclosure relates generally, but not exclusively, to the verification of images provided to electronic devices. In an exemplary embodiment, an electronic wallet is able to verify the authenticity of a received image before displaying a full card image comprising the received image.

BACKGROUND

There are numerous applications in which it is desirable to display an image on an electronic device. For example, when the user of an electronic device is viewing information from a service provider, displaying a logo or card image of the service provider gives the user a feeling of security and familiarity when viewing the information.

An application in which it is particularly desirable to display a familiar product image of a service provider is when generating a display of a cardholder's bankcard, that may represent an original physical plastic card. FIGS. 1a and 1b show card images of the front face of bankcards. FIGS. 1c and 1d show card images of the rear face of bankcards.

The generation of the images shown in FIGS. 1a, 1b, 1c and 1d allow card images to be displayed by, for example, a mobile telephone. This solves the problem of a cardholder having to carry a physical card since the virtual card displayed on the mobile telephone can be presented instead.

In order for an electronic device to display a specific image, the displayed image must be retrievable either from an internal memory in the electronic device or by the electronic device from an external source.

A problem with storing images on an electronic device is that the electronic device must have a large storage capacity if it is to be able to store all possible images that may be required to be displayed. Providing a large storage capacity is especially difficult with a portable electronic device. In addition, the images that are required to be displayed may be new images not already stored by the electronic device, or modified versions of existing images.

For an electronic device to display any image, it is therefore preferable for the image to be communicated to the electronic device from an external source.

A problem with known techniques for providing an electronic device with a specific image for display is that the electronic device has no way of verifying the trustworthiness of the received image. If a malicious party conducts, for example, a Domain Name System, DNS, attack, this can result in the electronic device receiving and displaying an incorrect image. This may be highly embarrassing and cause reputational damage to a service provider, such as a bank, if a wholly inappropriate image was displayed.

SUMMARY

According to a first aspect of the disclosure, there is provided a method for verifying an image by a first electronic device, the method comprising the first electronic device: sending a request for an image to a second electronic device, wherein the second electronic device is remote from the first electronic device and, optionally, a server; receiving an image and a certificate from the second electronic device, wherein the certificate comprises a protected checksum of the image; generating a checksum in dependence on the received image; performing a comparison in dependence on said generated checksum and the protected checksum received in the certificate; and verifying the received image in dependence upon the comparison.

Advantageously, the first electronic device is able to verify each received image and to prevent the display of any received images that are not authenticated.

In some embodiments, the protected checksum received in the certificate is a signed checksum and/or an encrypted checksum, the method further comprising: if the received protected checksum is encrypted, decrypting the encrypted checksum received in the certificate and performing said comparison in dependence on the decrypted checksum; and if the received protected checksum is a signed checksum, performing said comparison of the generated checksum and the checksum received in the certificate and verifying the received image by comparing the generated and signed checksums and validating the signature.

In some embodiments, the method further comprises the first electronic device displaying an image comprising the received image in dependence on the verification.

In some embodiments, the method further comprises the first electronic device receiving additional information associated with the image from the second electronic device; and generating a display of an image comprising the received image in dependence on the additional information.

In some embodiments, the additional information specifies one or more of the colour depth of the image, the size of the image and how the image should be displayed with other information.

In some embodiments, the method further comprises the first electronic device displaying an image comprising the received image and other information, wherein the other information is received from a source other than the second electronic device.

In some embodiments, the image is the background image corresponding to a service provider and the additional information specifies how the other information is overlaid on the background image in accordance with the specifications of the service provider.

In some embodiments, the displayed image comprises the front and/or back faces of a card; and the other information is account information.

In some embodiments, the method further comprises the first electronic device: receiving the certificate as metadata of, or within, the received image; and, if additional information is received with the image, receiving the additional information as metadata of, or within, the image.

In some embodiments, the method further comprises the first electronic device transmitting an indication of a desired size of an image to be received from the second electronic device with the request for an image.

In some embodiments, the received protected checksum is dependent on the image and the additional information, and the method comprises generating a checksum, for verifying the received image and additional information, in dependence on the received image and the additional information.

According to a second aspect of the disclosure, there is provided a method in a second electronic device for providing a requested image to a first electronic device, the method comprising the second electronic device: receiving a request for an image from a first electronic device; retrieving, in response to receiving the request, the image requested by the first electronic device; transmitting the retrieved image together with a certificate associated with the retrieved image to the first electronic device, wherein the certificate comprises a protected checksum of the retrieved image.

In some embodiments, the method further comprises the second electronic device: obtaining the protected checksum by obtaining a signed checksum of at least the retrieved image; and/or obtaining the protected checksum by obtaining an encrypted checksum of at least the retrieved image.

In some embodiments, the method according to the second aspect further comprises the second electronic device generating said checksum for each retrieved image.

In some embodiments, the method according to the second aspect further comprises the second electronic device retrieving additional information associated with the requested image; and transmitting the additional information with the image, wherein the additional information provides display information of the image.

In some embodiments, in the method according to the second aspect, the information stored by the second electronic device for transmitting to a first electronic device, consists of images and additional information associated with the images.

In some embodiments, in the method according to the second aspect, the received request comprises an indication of a size of an image, and the method further comprises converting, by the second electronic device, the size of the retrieved image in dependence on the received indication prior to the image being transmitted to the first electronic device.

In some embodiments, in the method according to the second aspect, the second electronic device only stores the largest size of each image that can be provided to the first electronic device.

In some embodiments, the method according to the second aspect further comprises the second electronic device: storing the converted version of the image; and retrieving the stored version of the image for transmitting to an electronic device when another request for said image of said indicated size is received.

In some embodiments, the method according to the second aspect further comprises the second electronic device: transmitting the certificate as metadata of, or within, the transmitted image; and, if additional information is transmitted, transmitting the additional information as metadata of, or within, the transmitted image.

In some embodiments, each checksum is dependent on a retrieved image and additional information of the retrieved image.

According to a third aspect of the disclosure, there is provided a method in a system comprising a first electronic device and a second electronic device, the method comprising: the method for verifying an image by the first electronic device according to the first aspect described above; and the method in the second electronic device for providing a requested image according to the second aspect described above.

According to a fourth aspect, there is provided an electronic device configured to perform the method according to the first aspect described above.

According to a fifth aspect, there is provided an electronic device, such as a server, configured to perform the method of the second aspect described above.

According to a sixth aspect, there is provided a system configured to perform the method of the third aspect described above.

DRAWINGS

Embodiments of the present disclosure will be described, by way of example only, with reference to the accompanying drawings, in which.

DETAILED DESCRIPTION

According to the embodiments of the systems and methods described herein, an electronic device 201 requests and receives one or more images for display. Advantageously, the electronic device 201 is able to verify the trustworthiness of each received image prior to the image being displayed. This prevents the display of any incorrect images that may be transmitted to the electronic device 201, for example, as a result of a DNS attack or other malicious activity.

Figure 2:
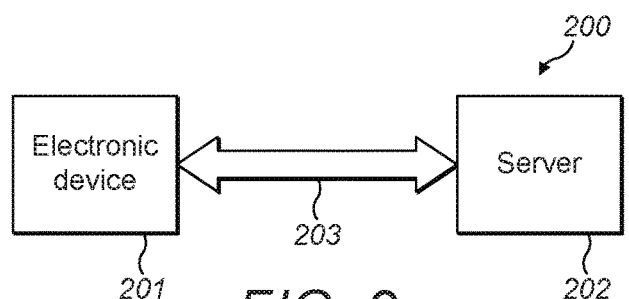
FIG. 2 shows a system comprising an electronic device in communication with a server according to an embodiment of the present disclosure.

FIG. 2 shows a system 200 according to an embodiment of the present disclosure. The system 200 comprises an electronic device 201 and a server 202. The electronic device 201 and the server 202 communicate with each other over a communications link 203. The communications link 203 may be wireless or fixed line.

Embodiments of the present disclosure include any electronic device 201 for displaying an image. In particular, but not exclusively, the method according to the embodiments described herein is contemplated for use by mobile phones, smart phones, Personal Digital Assistants, PDAs, laptop computers, tablets, fixed terminal computers, games consoles and televisions.

The server 202 stores images and information associated with the images. The Uniform Resource Locator, URL address of a resource supported by the server 202 for providing the service according to embodiments of the present disclosure is public information and any electronic device 201 can send a request for an image to the resource on the server 202. It is not necessary for the address of the resource supported by the server to be an URL address and any other type of address may be used. The server 202 is arranged to provide requested images to a large number of electronic devices 201.

Embodiments of the present disclosure are described in detail below with reference to the display of card images of financial service providers, in particular for generating a display of front and/or back faces of a bankcard. Although this is a preferred embodiment, embodiments are not limited to generating displays of card images and embodiments including the display of any image by any electronic device 201.

According to a first embodiment of the present disclosure, an electronic device 201 is provided with an address, for example a URL, that is the address of a resource on a server 202 that stores images, such as card images of service providers. The electronic device 201 uses the address to send a request to the resource with a reference that identifies the image that the electronic device 201 requires. For example, the electronic device 201 may be a mobile telephone, with the image reference being obtained by the mobile telephone during a provisioning or discovery phase of a mobile wallet application. Preferably, the image reference is short in order to keep the message length down and reduce the amount of information transferred when sending a request for an image.

The server 202 identifies the desired image from the received reference and sends the image to the electronic device 201 together with a certificate associated with the sent image. The certificate comprises a checksum, or hash, of at least the sent image data. The checksum, or hash, is protected by being signed and/or encrypted. If the checksum is encrypted, this may be with the private key of a certification authority or by any other encryption technique. If the checksum is signed, the signature could be produced using the private key of a certificate authority, or other known techniques.

The certificate is preferably transmitted as metadata of the image that it is associated with. However, it is not essential for the certificate to be transmitted as metadata and the certificate could alternatively be transmitted in other ways, such as the certificate being part of the image. That is to say, the image is modified to include the certificate. A viewer of the image would see the certificate as "noise" on the image, but the certificate could be extracted from the image by a processor.

The electronic device 201 receives the image data and the certificate. If the received checksum has been encrypted, the received checksum is then decrypted by the electronic device 201, for example by using a public key that corresponds to the private key used to encrypt the data. In addition, the electronic device 201 generates a checksum from the received image data.

If the received checksum is not signed, the electronic device 201 then compares the generated checksum with the received checksum. If the checksums are the same, then the image is determined to be trustworthy and the electronic device 201 proceeds to display the image. If, however, the checksums are different, the image is determined to be incorrect and the electronic device 201 does not display the image.

If the received checksum is signed, the electronic device 201 compares the generated checksum with the signed checksum and the image is determined to be trustworthy and displayed in dependence on successful validation of the signature. The validation may be performed using the corresponding public key to a private key used to generate the signature.

Advantageously, the electronic device 201 is able to verify each received image and to prevent the display of any unauthenticated images that are received.

Figure 3:
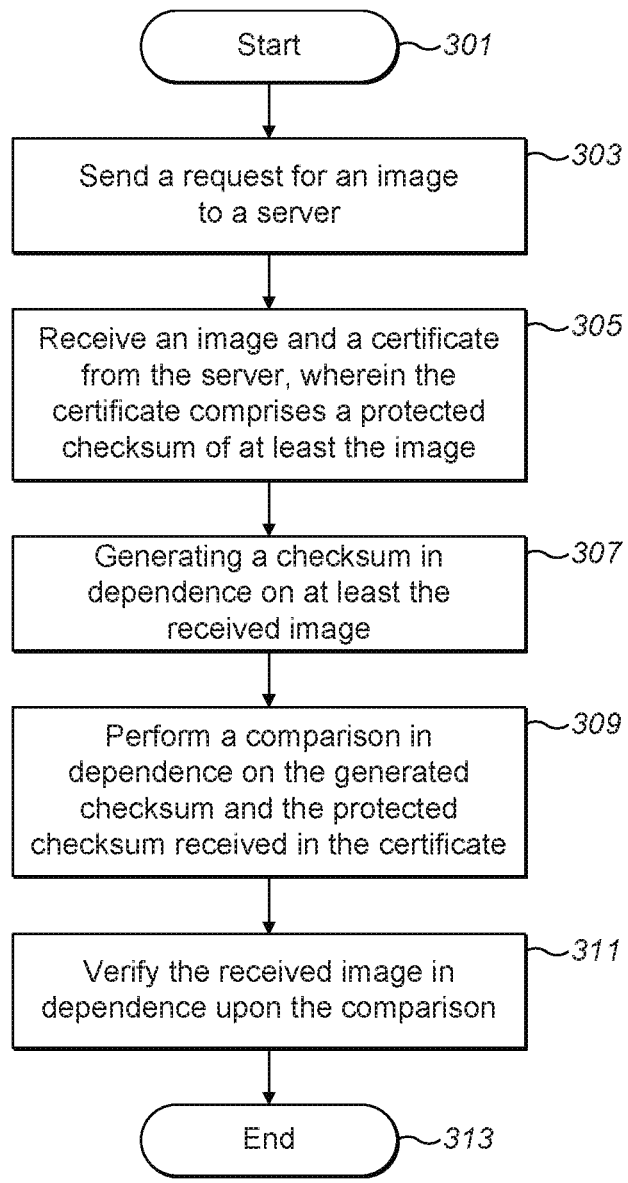
FIG. 3 is a method performed by an electronic device according to an embodiment of the present disclosure.

FIG. 3 shows a flowchart of a method for verifying an image by an electronic device 201 according to one embodiment of the present disclosure.

In step 301, the process begins.

In step 303, the electronic device 201 sends a request for an image to a server 202.

In step 305, the electronic device 201 receives an image and a certificate from the server 202, wherein the certificate comprises a protected checksum of the image.

In step 307, the electronic device 201 generates a checksum in dependence on the received image.

In step 309, the electronic device 201 performs a comparison in dependence on said generated checksum and the protected checksum received in the certificate.

In step 311, the electronic device 201 verifies the received image in dependence upon the comparison.

In step 313, the process ends.

Figure 4:
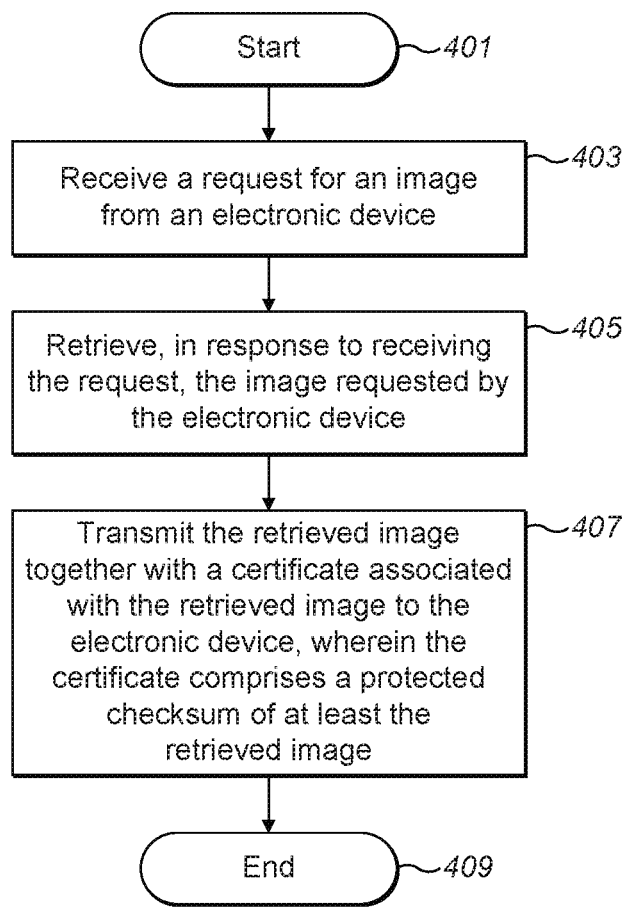
FIG. 4 is a method performed by a server according to an embodiment of the present disclosure.

FIG. 4 shows a flowchart of a method in a server 202 for providing a requested image to an electronic device 201 according to the first embodiment.

In step 401, the process begins.

In step 403, the server 202 receives a request for an image from an electronic device 201.

In step 405, the server 202 retrieves, in response to receiving the request, the image requested by the electronic device 201.

In step 407, the server 202 transmits the retrieved image together with a certificate associated with the retrieved image to the electronic device 201, wherein the certificate comprises a protected checksum of the retrieved image.

In step 409, the process ends.

The preferred generation of each certificate is described in more detail below.

The server 202, or preferably an independent third party such as a certificate authority, can generate the protected checksum in each certificate. Embedded into the software of the electronic device 201 is a Certificate Authority Key, or set of keys, that allows the electronic device to verify the source of the protected checksum. Once the source of the protected checksum has been validated, it is determined that its contents can be trusted, and the image checksum referenced by, or included in, the certificate obtained and compared with the checksum of the actual received image. Advantageously, the protected checksum coming from a trusted source and the determination of a correct checksum both ensure that an image is correctly authenticated.

An advantage of using a third party for checksum creation is that there only needs to be one checksum generation source, and therefore one key in the electronic device 201. In addition, new or additional servers can be provided without having to provide a new key to the electronic device 201. Preferably, the checksums are generated in real time through use of an online link between the server 202 and the third party for certificate creation.

It is not necessary for the checksum to be encrypted in the certificate, it may just be 'signed' by the certificate authority in the form of a certificate. There are many ways of producing such a certificate, such as directly putting the checksum into the certificate data (and hence encrypting it) or putting a hash of the checksum and potentially other associated data in the certificate.

According to a second embodiment of the present disclosure, in addition to the certificate, additional information is stored with the image that describes how the image should be displayed. This ensures that the image displayed by the electronic device 201, which may comprise other information not received from the server 202, is displayed in accordance with the specifications of, for example, a service provider corresponding to the requested image.

The electronic device 201 uses the address, that may be a URL, to send a request with an image identifier as described for the first embodiment. The server 202 responds to the request by transmitting the requested image, the certificate associated with the image and the additional information that describes how the image should be displayed. The additional information and certificate may be transmitted as metadata for the image that they are associated with or within the image. The electronic device 201 then generates an image comprising the retrieved image, together with other information that has already been obtained/generated by the electronic device 201, according to the instructions provided by the received additional information.

Figure 1A:
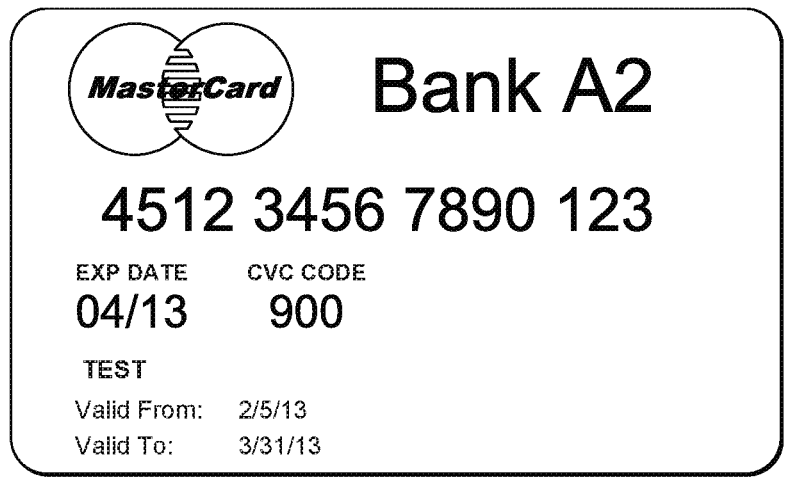
FIGS. 1a and 1b show representations of the front face of a virtual bankcard.
Figure 1B:
Figure 1C:
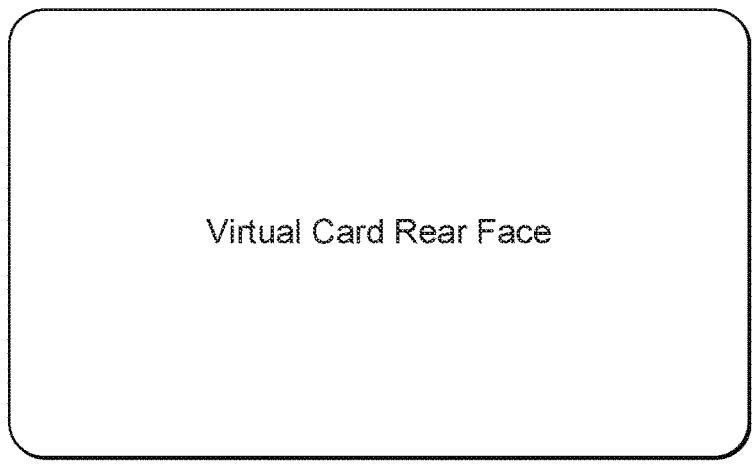
FIGS. 1c and 1d show representations of the rear face of a virtual bankcard.
Figure 1D:
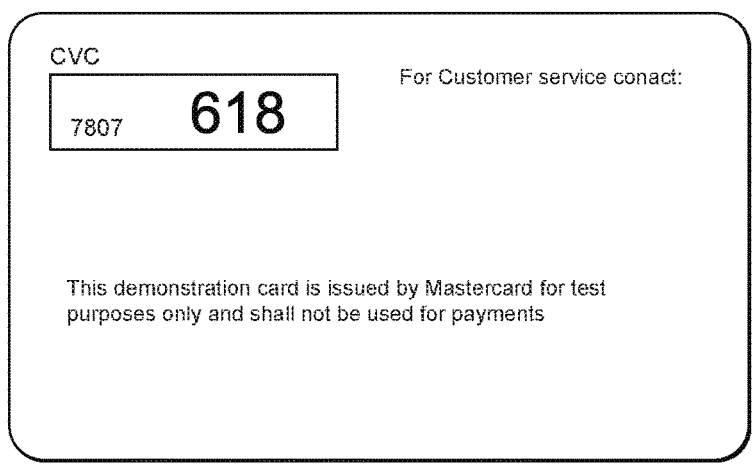
Figure 5:
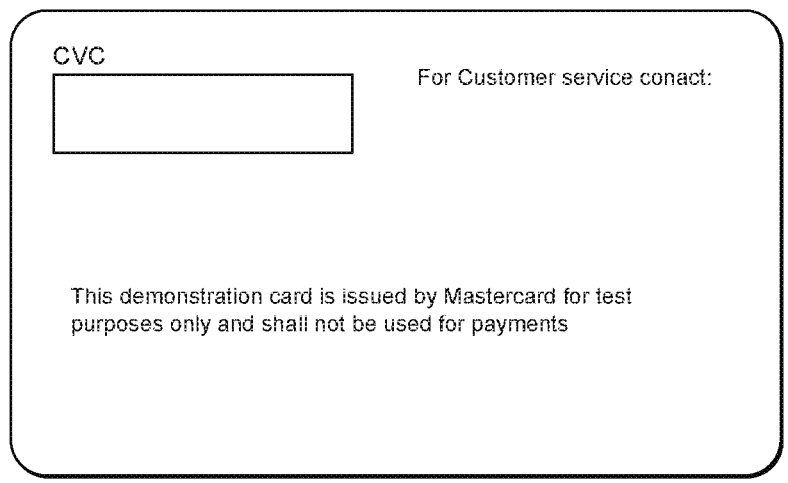
FIG. 5 shows an image of the rear face of a bank card that is retrievable from a server according to an embodiment of the present disclosure.

For example, the requested image from a server may be that of the rear face of a bank card, as shown in FIG. 5. The additional information is layout information that is metadata of the image. The electronic device 201 retrieves account information from a cardlet, which is a secure element within the electronic device. The card image as shown in FIG. 1*d* may therefore be displayed using the retrieved image, the layout information and the account information. The server therefore stores and provides background images for displaying card images, layout information and certificates of the images. The information from the cardlet provides the image reference of a required background image as well as the data elements to be overlaid on the image, such as the primary account number, PAN, PAN sequence number, expiry date, start date, cardholder name, card verification code, CVC2, etc.

Advantageously, by providing the layout information as metadata of, or within, the image rather than as information provided by a cardlet, a service provider can change the image without being constrained by the layout information originally stored in the cardlet.

According to a third embodiment of the present disclosure, the additional information may, as an alternative or in addition to the second embodiment, describe information such as the colour depth of the retrieved image or the number of pixels of the image. Advantageously, this provides the electronic device 201 with information that can be used to improve the display, or generation of the display, of the image.

According to a fourth embodiment of the present disclosure, in addition to sending a reference of the desired image in the request sent to the address, e.g. URL, the electronic device 201 sends a request for a particular size of image.

If the electronic device 201 is, for example, a mobile telephone, the required physical size of the image is relatively small and a large number of pixels is not required to provide an appropriate display of the image. If, however, the electronic device 201 is a television, the displayed image will be a lot larger and more pixels may be required to appropriately display the image. The fourth embodiment therefore allows the electronic device 201 to request an appropriate size of image given the display capabilities of the electronic device 201.

When the server 202 providing the image receives a request for an image of a particular size, the server 202 may retrieve an image of the requested size if an image of the requested size is already stored in the server 202. Alternatively, the server 202 may only store images with the highest definition, i.e. highest number of pixels, that it can provide. When an electronic device 201 requests an image with a lower definition, i.e. a lower number of pixels, the server 202 converts the high definition image stored therein into a lower definition image for transmitting to the electronic device 201.

In addition to obtaining an image of the requested size, the server 202 also obtains the certificate for the image. The certificate for each image may already have been generated and stored with each size of each image or, preferably, the server 202 generates the certificate of each transmitted image every time each image is retrieved, and, if required, re-sized, prior to each image being transmitted to the electronic device 201.

Advantageously, electronic devices 201 such as televisions receive images with an appropriate definition for the large size of their display. Electronic devices 201 such as mobile telephones receive a lower definition image that is appropriate for their smaller size of display and the bandwidth requirements for transmitting to the mobile telephone are reduced due to the lower definition image being transmitted.

Preferably, the server 202 providing the images only stores images and additional information for each of the images. This allows the server 202 to efficiently provide the requested information by providing a database that can be easily searched with an image reference to retrieve a requested image. It is particularly advantageous over techniques requiring electronic devices 201 to use html to obtain images from webpages as webpages comprise text, and other information, as well as the images and to extract only desired image data is difficult.

In addition, an image retrieved from a known webpage does not provide any of the advantages of the embodiments since the image is not transmitted with a certificate that allows the image to be verified, no additional information for improving the display of the image is provided and the image is only of a low definition.

The flowcharts and description thereof herein should not be understood to prescribe a fixed order of performing the method steps described therein. Rather, the method steps may be performed in any order that is practicable. Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

In particular, embodiments of the disclosure have been described with reference to a server 202. Embodiments of the disclosure also extend to other electronic devices performing the operations of the server 202 as described herein.

In the above described embodiments, a resource supported by the server 202 is described as having an URL address that is public information so that any electronic device 201 can send a request for an image to the resource supported by the server 202. However, the use of an URL address is only a preferred technique and any other method of requesting a resource supported by the server 202 may be used.

According to embodiments, the image file may contain the certificate and associated data, or, alternatively, the image file may be a normal image file with a separate set of associated data and a separate certificate. It is possible for extra data (e.g. both the certificate and associated data if required) to be embedded into an image file, which can be displayed as a normal image in a standard image viewer, but the 'extra' data can be extracted by special software.

In the above described embodiments, the checksum is of the sent image data. However, embodiments also include the checksum being of the sent image data as well as any additional information or any other associated data.

What is claimed is:
1. A method for displaying an image of a bank card associated with a particular service provider at an electronic device, the method comprising:

sending, by an electronic device, to a server, a request for an image of a bank card associated with a particular service provider, wherein the server is remote from the electronic device;
receiving, at the electronic device, from the server, a background image of the bank card corresponding to the particular service provider and a certificate associated with the background image, wherein the certificate comprises a protected checksum of at least the background image;
generating, at the electronic device, a checksum in dependence on at least the received background image;
retrieving, at the electronic device, account information to be overlaid on the background image; and
displaying, at the electronic device, the received background image and the account information overlaid on the background image when the generated checksum and the protected checksum received in the certificate match.

2. The method of claim 1, further comprising:
comparing, at the electronic device, the generated checksum and the protected checksum received in the certificate; and
verifying, at the electronic device, the received background image when the generated checksum and the protected checksum received in the certificate match.

3. The method of claim 2, wherein the protected checksum received in the certificate is a signed checksum and/or an encrypted checksum, the method further comprising:
when the received protected checksum is an encrypted checksum, decrypting, at the electronic device, the encrypted checksum received in the certificate and performing said comparison in dependence on the decrypted checksum; and
when the received protected checksum is a signed checksum, performing said comparison of the generated checksum and the checksum received in the certificate and verifying the received image by comparing the generated and signed checksums and validating the signature.

4. The method of claim 1, wherein receiving the background image of the bank card includes:
receiving the certificate as metadata of, or within, the received background image; and
receiving additional information as metadata of, or within, the background image, the additional information specifying how the account information is overlaid on the background image in accordance with specifications of the service provider.

5. The method of claim 4, wherein the additional information further specifies one or more of colour depth of the background image and size of the background image.

6. The method of claim 4, wherein the background image includes a front and/or a back face of the bank card.

7. The method of claim 6, wherein the request includes an indication of a desired size of the image of the bank card to be received from the server.

8. The method of claim 4, wherein the protected checksum is dependent on the background image and the additional information, and
wherein generating the checksum in dependence on at least the received background image includes generating the checksum in dependence on at least the received background image and the additional information.

9. A method for providing a requested image of a bank card to an electronic device, the method comprising:
receiving, at a server, from an electronic device, a request for an image of a bank card associated with a particular service provider;
retrieving, at the server, in response to receiving the request, at least the image of the bank card requested by the electronic device and additional display information associated with the image of the bank card; and
transmitting, at the server, to the electronic device, the retrieved image of the bank card and the retrieved additional information together with a certificate associated with the retrieved image of the bank card, wherein the certificate comprises a protected checksum of at least the retrieved image of the bank card.

10. The method of claim 9, further comprising:
obtaining, at the server, the protected checksum by obtaining a signed checksum of at least the retrieved image of the bank card; and/or
obtaining, at the server, the protected checksum by obtaining an encrypted checksum of at least the retrieved image of the bank card.

11. The method of claim 9, wherein the received request comprises an indication of a size of the requested image of the bank card; and
further comprising converting, by the server, the size of the retrieved image of the bank card in dependence on the received indication prior to transmitting the image of the bank card to the electronic device.

12. The method of claim 11, wherein the server only stores the largest size of each image that can be provided to the electronic device.

13. The method of claim 11, further comprising:
storing, at the server, the converted version of the image of the bank card; and
retrieving, at the server, the stored version of the image of the bank card for transmitting to another electronic device when another request for said image of said indicated size is received from the another electronic device.

14. The method of claim 9, wherein transmitting the retrieved image of the bank card and the retrieved additional information together with the certificate associated with the retrieved image of the bank card includes:
transmitting the certificate as metadata of, or within, the transmitted image of the bank card; and
transmitting the additional information as metadata of, or within, the transmitted image of the bank card.

15. The method of claim 14, further comprising generating, at the server, a separate protected checksum for each retrieved image;
wherein each protected checksum is dependent on the corresponding retrieved image and the additional information associated with the retrieved image.

16. The method of claim 9, wherein the image of the bank card includes a front and/or a back face of the bank card; and
wherein the additional information specifies how account information is overlaid on the image of the bank card in accordance with specifications of the service provider.

17. A system for providing a requested background image of a bank card to an electronic device, the system comprising:
a memory having background images of bank cards for multiple service providers; and
an electronic device in communication with the memory, the electronic device configured to:

retrieve from the memory, in response to a request for an image of a bank card associated with a particular service provider, at least the background image of the requested bank card;

obtain a protected checksum of at least the retrieved background image; and transmit the retrieved background image together with a certificate associated with the retrieved background image, wherein the certificate comprises the protected checksum of at least the retrieved background image.

18. The system of claim 17, wherein the electronic device is further configured to retrieve from the memory additional display information associated with the retrieved background image of the bank card, the additional display information specifying how account information is to be overlaid on the background image in accordance with specifications of the corresponding service provider; and in connection with transmitting the retrieved background image, the electronic device is configured to transmit the additional display information together with the background image.

19. The system of claim 17, wherein, in connection with obtaining the protected checksum of at least the retrieved background image, the electronic device is configured to:

obtain a signed checksum of at least the retrieved background image; and/or obtain an encrypted checksum of at least the retrieved background image.

20. The system of claim 17, wherein the background image of the bank card includes a front and/or a back face of the bank card.

* * * * *